United States Patent

Delorean

[15] 3,700,080
[45] Oct. 24, 1972

[54] TRANSMISSION WITH FLUID PRESSURE RELEASED BRAKE

[72] Inventor: John Z. Delorean, Bloomfield Hills, Mich.

[73] Assignee: General Motors Corporation, Detroit, Mich.

[22] Filed: Aug. 25, 1971

[21] Appl. No.: 174,724

[52] U.S. Cl. ..................... 192/4 A, 188/69, 188/170, 251/294, 91/358
[51] Int. Cl. ...................... F16d 67/00, B60k 29/02
[58] Field of Search............ 188/31, 69, 170; 192/4 A

[56] References Cited

UNITED STATES PATENTS

| | | | |
|---|---|---|---|
| 2,912,085 | 11/1959 | Lorean | 192/4 A |
| 2,963,115 | 12/1960 | Peras | 188/69 |
| 3,074,513 | 1/1963 | Robinson | 188/69 |
| 3,373,850 | 3/1968 | Helmer | 192/4 A |

*Primary Examiner*—Benjamin W. Wyche
*Attorney*—Warren E. Finken

[57] ABSTRACT

The parking brake mechanism illustrated includes a cable-actuating arrangement wherein the removal of the Park pawl from the teeth of a transmission output shaft, under load conditions, is hydraulically assisted by a piston and valve arrangement which is actuated by the reaction to cable movement or an arcuately positioned cable sheath having one end fixed on the pushbutton housing and the other movable end connected to the valve body.

5 Claims, 6 Drawing Figures

PATENTED OCT 24 1972

INVENTOR.
John Z. DeLorean
BY
John P. Moran
ATTORNEY

INVENTOR.
John Z. DeLorean
BY
John P. Moran
ATTORNEY

INVENTOR.
John Z. DeLorean
BY
John P. Moran
ATTORNEY

TRANSMISSION WITH FLUID PRESSURE RELEASED BRAKE

The invention relates generally to parking brake mechanisms and, more particularly, to hydraulically-assisted parking brake disengagement means.

Whenever a positive brake is employed, such as the kind with interengaging teeth, there exists the problem of disengagement under load, especially when the interengaged teeth are designed so as to tend not to separate under load. A specific example of the problem occurs with the positive type parking brake mechanism commonly employed in automatic transmissions for motor vehicles. When the vehicle is stationed on a hill, the transmission parking brake is loaded so that the forces resisting disengagement are so great that they interfere with easy disengagement. Consequently, to design for this extreme condition, leverages must be increased through the agency of links and levers, and dimensional tolerances must be carefully maintained to insure that the parking brake can always be easily disengaged.

Accordingly, a general object of the invention is to provide improved means for readily disengaging a parking brake mechanism.

Another object of the invention is to provide an improved hydraulically-assisted parking brake disengagement means for use in conjunction with a cable-actuated shift control.

A further object of the invention is to provide a parking brake disengagement means wherein the cable sheath is fixed at the operator end and connected at the other end to a valve body, such that manual actuation of the enclosed cable produces a reaction in the sheath, moving the valve body so as to communicate line pressure to move a piston to assist the movement of a rod connected to the cable, with the rod having an enlarged end formed thereon for pivoting a spring-biased lever out of engagement with the parking pawl, thus permitting a spring to pull the pawl out of engagement with teeth formed on the transmission output shaft.

These and other objects and advantages of the invention will be apparent when reference is made to the following description and accompanying drawings, wherein.

Figure 1:
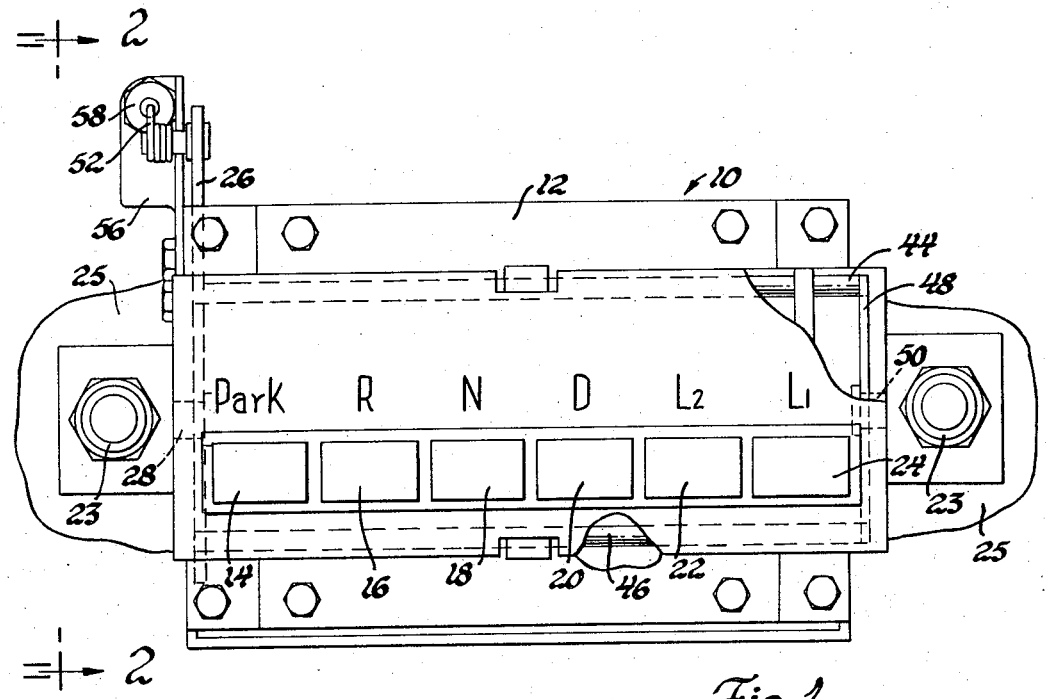
FIG. 1 is a front view of an instrument panel-mounted pushbutton-type transmission shift control.
Figure 2:
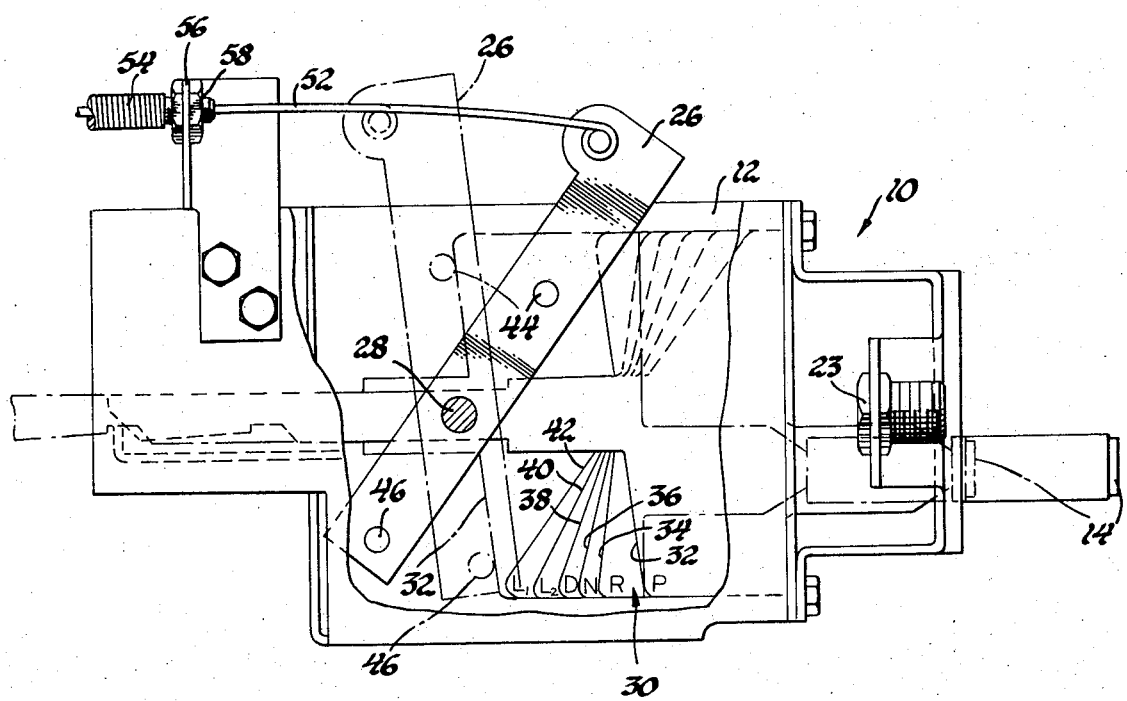
FIG. 2 is a side view taken along the plane of line 2—2 of FIG. 1, and looking in the direction of the arrows.

Referring now to the drawings in greater detail, FIGS. 1 and 2 illustrate an instrument panel-mounted pushbutton assembly 10, including a housing 12 having slidably mounted thereon the usual drive ratio pushbuttons 14, 16, 18, 20, 22, and 24, respectively designated as P-R-N-D-$L_2$-$L_1$. The housing 12 is secured by any suitable means, such as bolts 23, to a vehicular instrument panel, represented generally at 25. A lever 26, extending from the housing 12, is pivotally mounted on a fixed pivot pin 28 and is movable to various drive ratio positions in response to finger depression of the corresponding P-R-N-D-$L_2$-$L_1$ pushbuttons. This is accomplished by virtue of there being plate members 30 secured to the respective inner ends of the pushbuttons. The plate members 30 have differently tapered inner abutment faces 32, 34, 36, 38, 40, and 42 formed thereon cooperative with the respective pushbuttons 14, 16, 18, 20, 22, and 24. Upper and lower rods 44 and 46 are pivotally mounted at one end thereof on the lever 26 and extend across the housing 12 (FIG. 1) adjacent the inner abutment faces 32, 34, 36, 38, 40, and 42. The rods 44 and 46 are pivotally connected at their other ends to a bracket 48 which, in turn, is pivotally mounted at its center on a fixed pivot pin 50.

Figure 3:
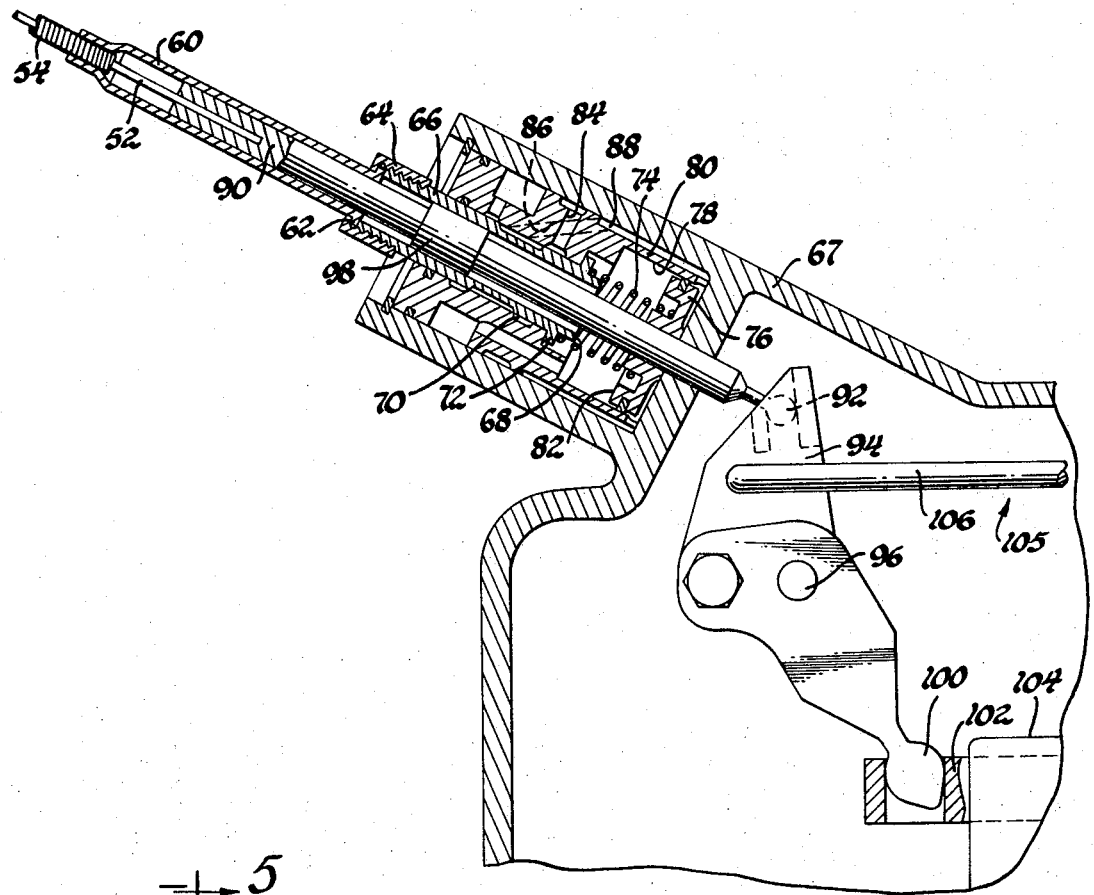
FIG. 3 is a fragmentary cross-sectional view of a portion of the shift control mechanism embodied in the invention.

A cable 52 is pivotally connected to the extended end of the lever 26. The cable 52 extends through a sheath 54 which is secured to a fixed abutment 56 by a suitable connector, such as a threaded fastener 58. As seen in FIG. 3, the sheath 54 is secured at its other end to an end of a sleeve member 60. A shoulder 62 is formed on the other end of the sleeve member 60 and connected by a nut 64 to a valve body 66, the latter being mounted in a housing 67 and having a free inner end face 68. An annular passage or groove 70 is formed around the outer periphery of the valve body 66 at an intermediate location thereon. A shoulder 72 is formed on the end of the valve body 66 adjacent the end face 68 and opposite the shoulder 62. A spring 74 is mounted between the shoulder 72 and a piston 76 in a chamber 78 formed in a sleeve member 80 surrounding the valve body 66. An end face 82 of the piston 76 is oppositely disposed from the valve end face 68. A line-pressure radial passage 84 and an angularly-extending passage 86 are formed in the sleeve member 80. An annular passage 88 is formed in the sleeve member 80 communicating between the outermost portion of the angular passage 86 and the chamber 78.

A rod 90 is connected to the end of the cable 52 by any suitable method, such as crimping. A ball-end 92 is formed on the end of the rod 90 and connected for pivotal movement with a lever 94 which, in turn, is pivotally mounted about a pivot pin 96. A land or shoulder portion 98 is formed on the rod 90 at an intermediate location therealong. An extension 100 is formed on the lever 94 for operative interconnection with a conventional valve 102 in the transmission 104 for selecting the desired drive ratio.

A rod or link 105 (FIG. 3) having a small diameter portion 106 is pivotally connected at a bent end 108 (FIG. 5) formed on the link portion 106 to an opening 110 formed in the lever 94. A larger diameter portion 112 is formed on the link 105, with a frustoconical portion 114 formed between the smaller diameter portion 106 and the larger diameter portion 112. The link 105 extends between a fixed abutment 116 (FIG. 4) and a contoured surface 118 of a lever 120 which is pivotally mounted on a pin 122. A roller 124 is pivotally mounted on a pin 125 between legs 126 (FIG. 5) and 128 formed on the lever 120. A parking pawl 130 (FIG. 4) is pivotally mounted about a fixed pin 132 and includes contoured surfaces 134 and 135 adjacent the outer periphery of the roller 124 for at times engaging in rolling contact therewith. A spring 136 is fixed at one end to a fixed abutment 138 and at the other end to an opening 140 formed in the pawl 130. A tooth-like member 142 is formed on an end of the pawl 130 opposite the contoured surface 134, suitable for at times meshing with the spaces or valleys 144 formed between teeth 146 formed on the transmission output shaft 148. A spring 150 is mounted between a fixed abutment 152 and a surface 154 formed on the lever 120, urging the contoured surface 118 into contact with either of the adjacent two-diameter portions 106 or 112 of the link 105.

OPERATION

Figure 4:
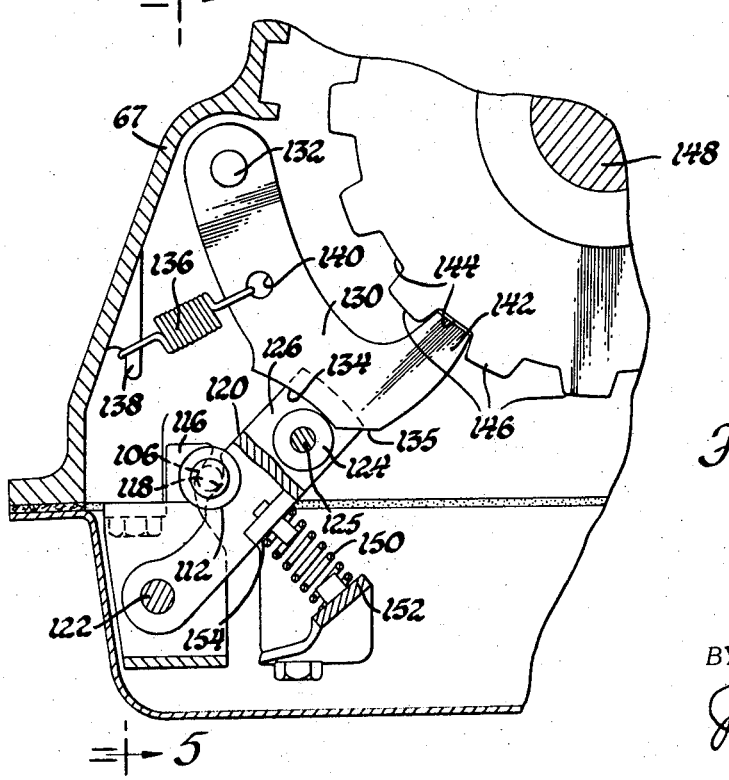
FIG. 4 is a fragmentary cross-sectional view of the parking brake mechanism embodied in the invention.

It should first be realized that when the PARK pushbutton 14 (FIG. 2) is depressed, the tooth-like member 142 (FIG. 4) is positioned in one of the spaces 144 between the parking gear teeth 142 formed on the transmission output shaft 148 to prevent rotation of the latter. This position is the result of the abutment face 32 abutting against the lever 26, positioning the latter as illustrated by broken lines in FIG. 2 and thereby positioning the cable extension rod 90 in its extreme rightmost position (FIG. 3), causing the smaller diameter link portion 106 to be confined between the contoured surface 118 (FIG. 4) of the lever 120 and the fixed abutment 116, with the spring 150 urging the lever 120 into contact with the link portion 106, thereby bringing the roller 124 into contact with the contoured surface 134 of the pawl 130, as illustrated in FIG. 4. Thus, in the PARK position, the larger diameter portion 112 (FIG. 5) of the link 105 is positioned to the right of the lever 120, permitting the surface 118 of the latter to be urged into contact with the smaller diameter link portion 106, as indicated.

Figure 5:
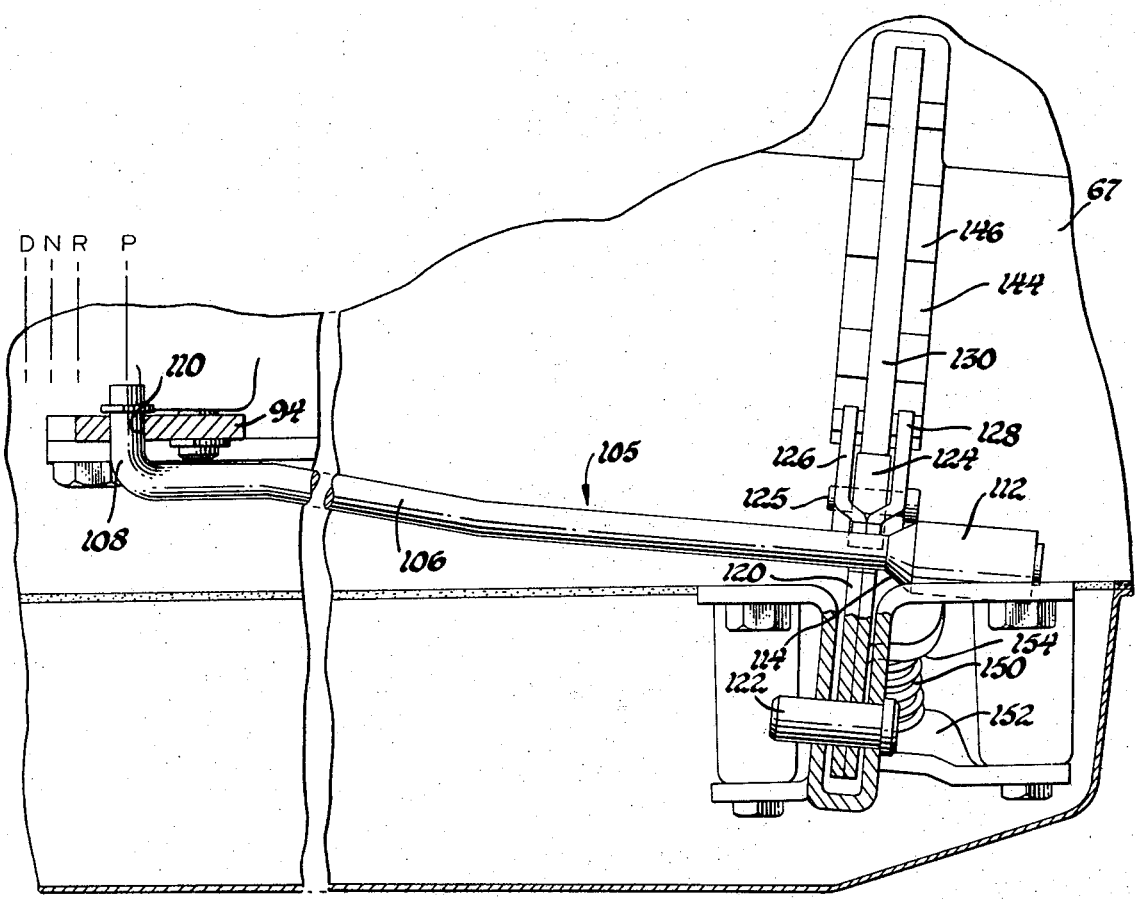
FIG. 5 is a fragmentary cross-sectional view taken along the plane of line 5—5 of FIG. 4, and looking in the direction of the arrows.

When any drive ratio position other than PARK is selected, it is apparent from FIGS. 2, 4, and 5 that the frustoconical surface 114 and the larger diameter link portion 112 will be drawn leftwardly (FIG. 5) as a result of the lever 26 (FIG. 2) being pivoted in a clockwise direction by one of the plate members 30 end faces 34, 36, 38, 40, or 42. This causes the lever 120 to be spread away from the fixed abutment 116, against the force of the spring 150, thereby rotating the axis of the roller 124 in a clockwise direction, along first the contoured surface 134 of the pawl 130, and then along the surface 135 thereby permitting the spring 136 to pull the tooth-like member 142 of the pawl 130 out of the space 144, thus freeing the transmission output shaft 148.

The valve 66/80 and piston 76 arrangement illustrated in FIG. 3 serves to assist the movement of the larger diameter link portion 112 (FIG. 5) through the space between the surface 118 of the lever 120 and the fixed abutment 116, such movement not generally being possible with only the force resulting from the manual depression of one of the R-N-D-L$_2$-L$_1$ pushbuttons with one's finger.

Figure 6:
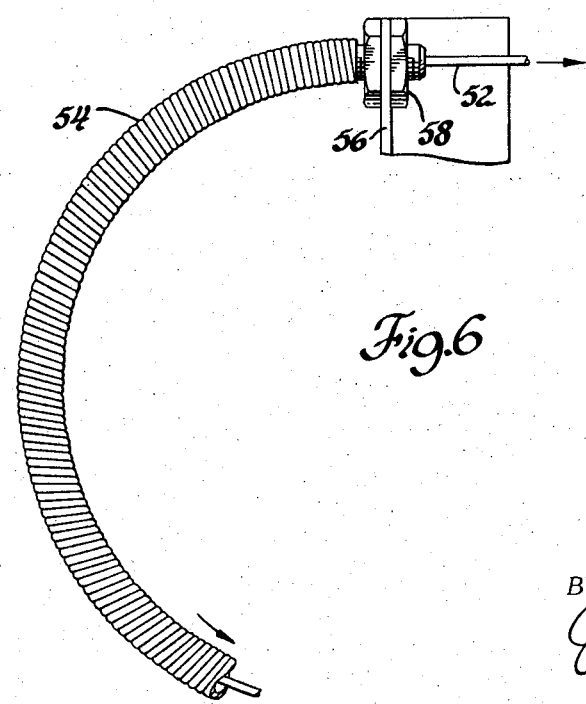
FIG. 6 is a fragmentary cross-sectional view of the cable portion of the invention.

Such hydraulic assist occurs by virtue of the reaction of an arcuate-shaped cable 52 (FIG. 6) encased in the sheath 54. As may be realized from a review of FIG. 6, when one end of the cable 52 is pulled in one direction through a fixed end 56/58 of the sheath 54, the reaction at the other movable end of the sheath 54 is a movement in the opposite direction. It may be noted in FIG. 3 that the free end of the sheath 54 is connected to the valve body 66 by the sleeve member 60 and the nut 64.

Under adverse load conditions, such as would occur when the vehicle is parked on an incline, the tooth-like member 142 (FIG. 4) of the parking pawl 130 is generally wedged tightly in one of the spaces 144 against the side wall of one of the teeth 146. This generally causes the lever 120 to stoutly resist the movement of the larger diameter link portion 112 through the space between the surface 118 of the lever 120 and the fixed abutment 116 in response to movement of the cable 52 by one of the R-D-L$_2$-L$_1$ pushbuttons. Such resistance is overcome by virtue of the sheath 54 exerting a pressure to the right (FIG. 3), as discussed above, as a result of the leftward (FIGS. 2 and 3) movement of the cable 52. As may be noted in FIG. 3, this moves the valve body 66, which is connected to the sheath 54 via the sleeve member 60 and the nut 64, to the right until the end face of the nut 64 abuts against the adjacent outer face of the sleeve member 80, moving the annular passage 70 on the valve body 66 into communication with the line-pressure feedline 84, permitting fluid at line pressure to flow therefrom through the annular passage 70 and thence through the angular passage 86 into the annular opening 88 around the sleeve member 80 to the portion of the chamber 78 to the right of the piston 76. The piston 76 is thus forced to the left in FIG. 3, causing the front face 82 of the piston 76 to contact the land or shoulder 98 formed on the cable extension rod 90, which has been pushed to the right of the end face 68 by the cable 52, thereby assisting the cable extension rod 90 and the associated ball-end 92, lever 94 and small diameter link portion 106 in pulling the conical portion 114 and the larger diameter portion 112 through the opening between the surface 118 of the pivotable lever 120 and the fixed abutment 116, causing the roller 124 to move to the right (FIG. 4), away from the contoured surface 134 and permitting the spring 136 to pull the tooth-like member 142 of the pawl 130 out of the space 144. At this point, either or both the spring 74 (FIG. 3) against the shoulder 72, and/or the abutment of the end face 82 of the piston 76 against the end face 68 of the valve body 66 causes the valve body 66 to move back to the left, shutting off the flow of fluid at line pressure from the radial passage 84 to the chamber 78 to the right of the piston 76, and permitting the spring 74 to return the piston 76 to the position illustrated in FIG. 3, ready for the next depression of the PARK pushbutton 14.

As previously explained, when the PARK pushbutton 14 is depressed, the small diameter link portion 106 is moved into position between the contoured surface 118 (FIG. 4) of the lever 120 and the fixed abutment 116. This permits the spring 150 to urge the lever 120 in a counterclockwise direction about the pivot pin 122, thereby causing the roller 124 to roll first along the contoured surface 135 of the pawl 130, and then along the other contoured surface 134 thereof to force the tooth-like member 142 of the pawl 130 into the adjacent space 144 between the teeth 146 of the transmission output shaft 148 as soon as the shaft 148 revolves to align the elements 142 and 144 to facilitate the engagement thereof.

It should be apparent that the invention provides a simplified and efficient means for disengaging the parking brake mechanism under all load conditions, utilizing the reaction of the sheath to the manual actuation of the cable under load to open a valve and thus effect movement of a piston to assist the disengagement of a lever from the parking pawl, thereby permitting a spring to pull the pawl out of engagement with teeth formed on the transmission output shaft.

While but one embodiment of the invention has been shown and described, other modifications thereof are possible.

I claim:

1. In a transmission parking brake mechanism for a vehicle, a brake disengaging system comprising a rotatable toothed member drive-connected to the vehicle wheels, a locking pawl movable into and out of an engaged position relative to said rotatable toothed member, contact means for pivotally contacting said locking pawl for maintaining said locking pawl in engagement with said rotatable toothed member, a stepped linkage member reciprocally mounted adjacent said contact means, spring means for urging said contact means into contact with both said locking pawl and said stepped linkage member, cable means operatively connected to said stepped linkage member, a sheath mounted around said cable means and fixed at one end thereof, selector means for manually reciprocally moving said cable means through said sheath, valve means secured to the free end of said sheath, piston means operatively connected to said valve means and to said stepped linkage member for moving said stepped linkage member so as to cause the larger stepped portion thereof to move said contact means out of contact with said locking pawl in response to the reaction of said sheath to movement of said cable means therethrough when said locking pawl and said contact means are tightly engaged due to vehicle loads tending to lock up said locking pawl and said rotatable toothed member.

2. In a transmission parking brake mechanism for a vehicle, including a rotatable member drive-connected to the vehicle wheels, a toothed locking member formed on said rotatable member, and a toothed locking element pivotable into and out of an engaged position relative to said toothed locking member, a brake disengaging system comprising spring-biased lever means for contacting said toothed locking element for maintaining said toothed locking element in engagement with said toothed locking member, variable diameter rod means reciprocally mounted adjacent said lever means, cable means operatively connected to said variable diameter rod means, a sheath mounted around said cable means and fixed at one end thereof, selector means for manually reciprocally moving said cable means through said sheath and said variable diameter rod means past said lever means, valve means secured to the free end of said sheath, piston means operatively connected to said valve means and to said variable diameter rod means for moving said variable diameter rod means so as to cause a larger diameter portion thereof to move said lever means out of contact with said toothed locking element in response to the reaction of said sheath to movement of said cable means therethrough under load conditions.

3. In a transmission parking brake mechanism for a vehicle, a brake disengaging system comprising a rotatable member drive-connected to the vehicle wheels, a toothed locking member formed on said rotatable member, a toothed locking element pivotable into and out of an engaged position relative to said toothed locking member, lever means for pivotally engaging said toothed locking element for maintaining said toothed locking element in engagement with said toothed locking member, two-diameter rod means reciprocally mounted adjacent said lever means, spring means for urging said lever means into contact with both said toothed locking element and said two-diameter rod means, cable means operatively connected to said two-diameter rod means, a sheath mounted around said cable means and fixed at one end thereof, selector means for manually reciprocally moving said cable means through said sheath, valve means secured to the free end of said sheath, piston means operatively connected to said valve means and to said two-diameter rod means for moving said two-diameter rod means so as to cause the larger diameter thereof to move said lever means out of contact with said toothed locking element in response to the reaction of said sheath to movement of said cable means therethrough.

4. In a transmission parking brake mechanism for a vehicle, a brake disengaging system comprising a rotatable member drive-connected to the vehicle wheels, a toothed locking member formed on said rotatable member, a toothed pawl member pivotable into and out of an engaged position relative to said toothed locking member, first spring means for urging said toothed pawl member out of contact with said toothed locking member, a pivotally mounted lever having a contoured surface formed thereon, a roller rotatably mounted on said lever for rotatably contacting said toothed pawl member for maintaining said toothed pawl member in engagement with said toothed locking member, linkage means including a small diameter portion, a larger diameter portion, and a frusto-conical portion intermediate said small and larger diameter portions, said linkage means being reciprocally mounted adjacent said contoured surface of said lever, second spring means for pivotally urging said contoured surface of said lever into contact with said linkage means and said roller into contact with said toothed pawl member, a cable, a sheath mounted around said cable and fixed at one end thereof, said cable being reciprocally slidably movable within said sheath, selector means operatively connected to one end of said cable for manually reciprocally moving said cable through said sheath, valve means secured to the free end of said sheath, a rod member secured to the other end of said cable and having a shoulder formed thereon, said shoulder being slidably mounted within said valve means, said rod member being operatively connected to the small diameter portion of said linkage means, piston means operatively connected to said valve means and slidably mounted on said rod member for contacting said shoulder so as to cause said frusto-conical portion and said larger diameter portion of said linkage means to pivot said lever out of contact with said toothed pawl member in response to the reaction of said sheath to movement of said cable therethrough against the force of said second spring means, thereby permitting said first spring means to pull said toothed pawl member out of contact with said toothed locking member.

5. In a transmission parking brake mechanism for a vehicle, a brake disengaging system comprising a rotatable member drive-connected to the vehicle wheels, a locking gear secured to said rotatable member, a pawl having a tooth-shaped free end pivotable into and out of engagement with said locking gear, a first spring for urging said tooth-shaped free end out of contact with said locking gear, a pivotally mounted lever having a cam surface formed thereon, a roller rotatably mounted on said lever for rotatably contacting said pawl for maintaining said tooth-shaped free end in engagement with said locking gear, a linkage rod including a small diameter portion, a larger diameter portion, and a frusto-conical portion intermediate said small and larger diameter portions, said linkage rod being reciprocally mounted adjacent said cam surface of said lever, a second spring for pivotally urging said cam surface of said lever into contact with said linkage rod and said roller into contact with said pawl, a flexible cable, a sheath mounted around said flexible cable and fixed at one end thereof, said flexible cable being reciprocally slidably movable within said sheath, a pivotable rack secured to one end of said flexible cable, a plurality of differently contoured lever surfaces slidably mounted adjacent said pivotable rack, a plurality of drive ratio selector push-buttons respectively connected to said plurality of lever surfaces for contacting said rack one at a time to pivot said rack to reciprocally move said flexible cable through said sheath, a valve body secured to the free end of said sheath, a solid rod member secured to the other end of said flexible cable and having a shoulder formed thereon, said shoulder being slidably mounted within said valve body, said solid rod member being pivotally connected to the small diameter portion of said linkage rod, a valve sleeve fixed around said valve body, a conduitry system formed on said valve sleeve and valve body, a source of fluid under pressure for said conduitry system, piston means operatively connected to said valve sleeve and valve body and slidably mounted on said solid rod member for contacting said shoulder in response to said fluid under pressure from said conduitry system resulting from the reaction of said sheath to manual movement of said flexible cable therethrough so as to cause said frusto-conical portion and said larger diameter portion of said linkage rod to pivot said lever out of contact with said pawl against the force of said second spring, thereby permitting said first spring to pull said tooth-shaped free end of said pawl out of contact with said locking gear.

* * * * *